Feb. 5, 1952  H. G. ALLEN  2,584,529
PACKAGING MACHINE
Filed April 28, 1950  6 Sheets-Sheet 2

Inventor
Howard G. Allen
by
Bean, Brooks, Buckley & Bean
Attorneys

Feb. 5, 1952        H. G. ALLEN        2,584,529
PACKAGING MACHINE
Filed April 28, 1950        6 Sheets-Sheet 3
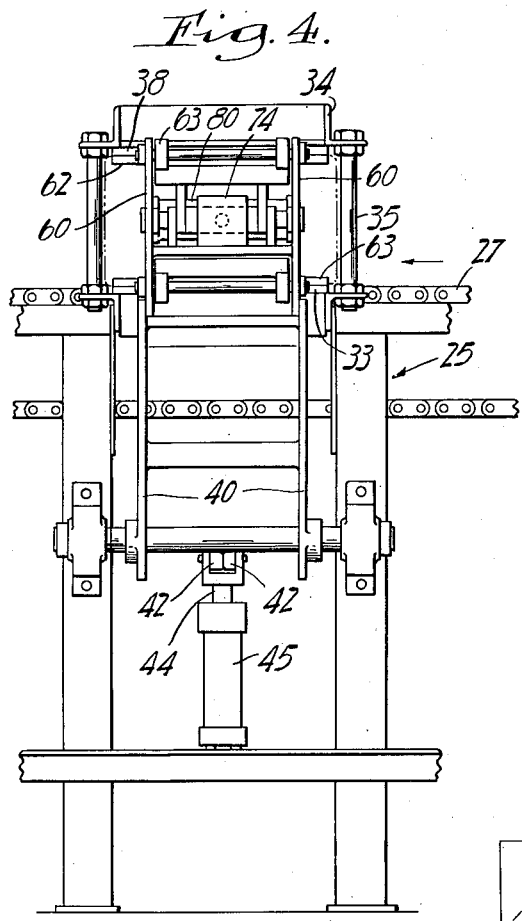
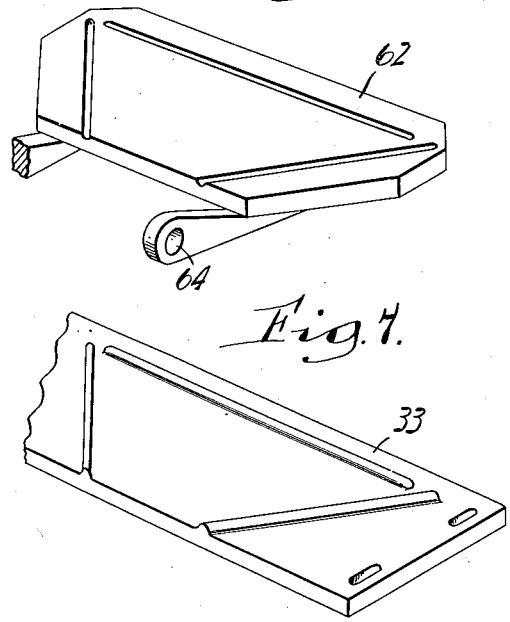
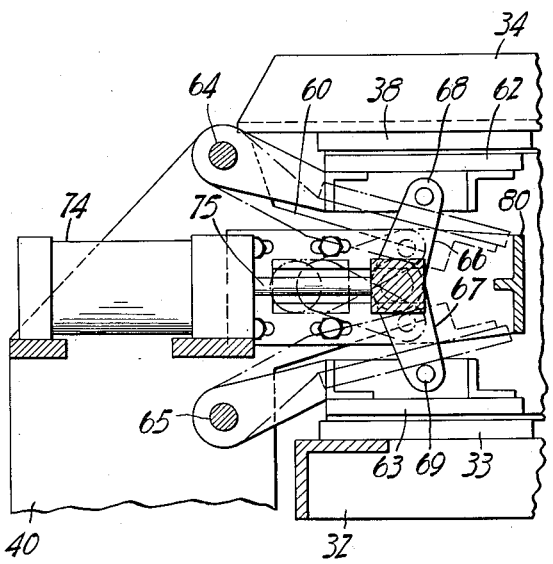
Inventor
Howard G. Allen
by
Bean, Brooks, Buckley & Bean.
Attorneys

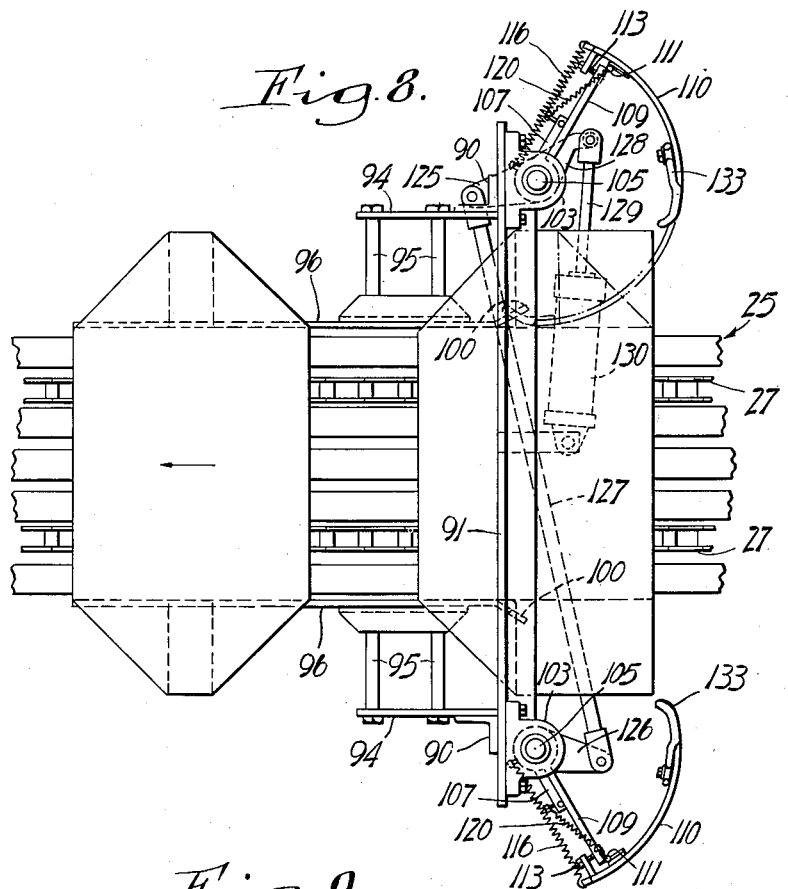
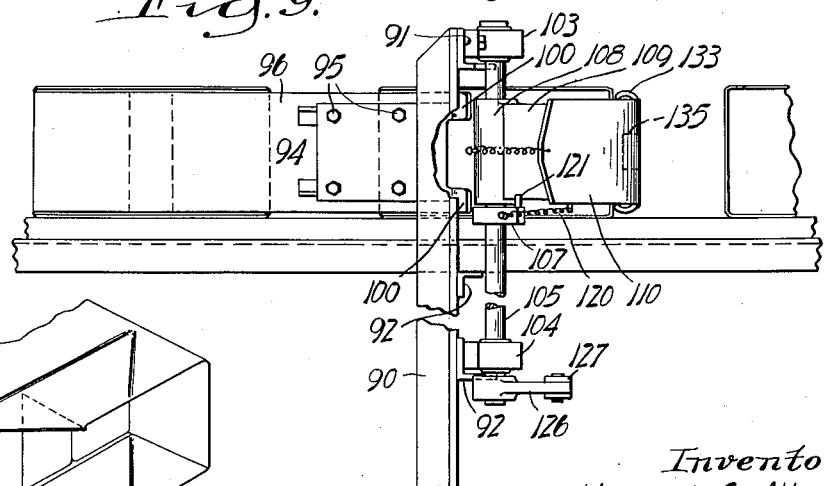
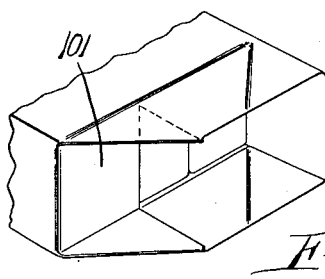

Feb. 5, 1952     H. G. ALLEN     2,584,529
PACKAGING MACHINE

Filed April 28, 1950     6 Sheets-Sheet 5

Inventor
Howard G. Allen
by
Bean, Brooks, Buckley & Bean.
Attorneys

Feb. 5, 1952 — H. G. ALLEN — 2,584,529
PACKAGING MACHINE
Filed April 28, 1950 — 6 Sheets-Sheet 6

Inventor
Howard G. Allen
by
Bean, Brooks, Buckley & Bean
Attorneys

Patented Feb. 5, 1952

2,584,529

UNITED STATES PATENT OFFICE 2,584,529

PACKAGING MACHINE

Howard G. Allen, Niagara Falls, N. Y., assignor to Savannah Sugar Refining Corporation, Savannah, Ga.

Application April 28, 1950, Serial No. 158,890

16 Claims. (Cl. 53—148)

This invention relates to bag forming apparatus and particularly to novel means for completing the formation of a bag and sealing the same with the contents of the bag disposed therein.

The conventional process of packaging goods in bags comprises the fabrication of a complete bag closed at one end and open at the other, following which the contents of the bag are deposited therein and the open end of the bag is closed and sealed. In my co-pending application Serial No. 48,445, filed September 9, 1948, I disclose apparatus wherein a bag blank is wrapped about a group of articles and adhesively secured in generally rectangular tubular form about such articles with both ends of the tube open and extending outwardly beyond the within articles. In one instance of use of the apparatus of the present invention the open ended tubular bag forming member may comprise a larger bag wrapped about an assembled group of smaller bags of material as described in detail in the above co-pending application, such smaller bags comprising the "articles" referred to above.

The present apparatus is arranged to receive such open-ended, partially formed bags with the articles contained therein and to successively crease, tuck, and fold and adhesively secure the two ends of the tubularly arranged bag blank to complete the formation of a secure and fully closed bag, the bag being so formed that when one end is subsequently opened the bag will remain in its fully fabricated condition while articles are removed therefrom and thereafter. The bag thus formed is to be distinguished from ordinary wrapped packages where the package, upon opening to remove the contents, generally disintegrates or ceases to exist as a usable container, either while it is being emptied or for subsequent reuse.

The following specific description and accompanying drawings set forth a complete embodiment of one form of the apparatus of the present invention by way of example, but it is to be understood that the principles of the invention are not limited thereto, and that various mechanical modifications may be made without departing from the spirit of the invention, which is not limited excepting as defined in the appended claims.

In the drawings:

Fig. 4 is a fragmentary side elevational view of the portion of the apparatus illustrated in Figs. 2 and 3;

Fig. 5 is a fragmentary cross-sectional view of a portion of the creasing apparatus viewed as in Fig. 2 but on a slightly larger scale;

Fig. 6 is a detailed perspective view of one of the upper movable creasing implements;

Fig. 7 is a fragmentary perspective view of a lower stationary creasing implement;

Fig. 8 is a fragmentary plan view of the side tucking portion of the apparatus;

Fig. 9 is a fragmentary side elevational view of the apparatus shown in Fig. 8;

Fig. 13 is a fragmentary top plan view of a portion of the final folding apparatus of Fig. 12;

Fig. 14 is a fragmentary perspective view of one end of a bag showing the first step in the side tuck forming operation;

Like characters of reference denote like parts throughout the several figures of the drawings. Speaking generally, and referring particularly to Figs. 1 and 2, the portion of the apparatus extending from the final turret of the bag wrapping apparatus to the opposite end of the machine comprises generally a table designated generally 25 in Figs. 1 and 2, the top of the table being formed by a plurality of parallel longitudinally extended spaced rails, as appears best in Fig. 2.

Figure 2:
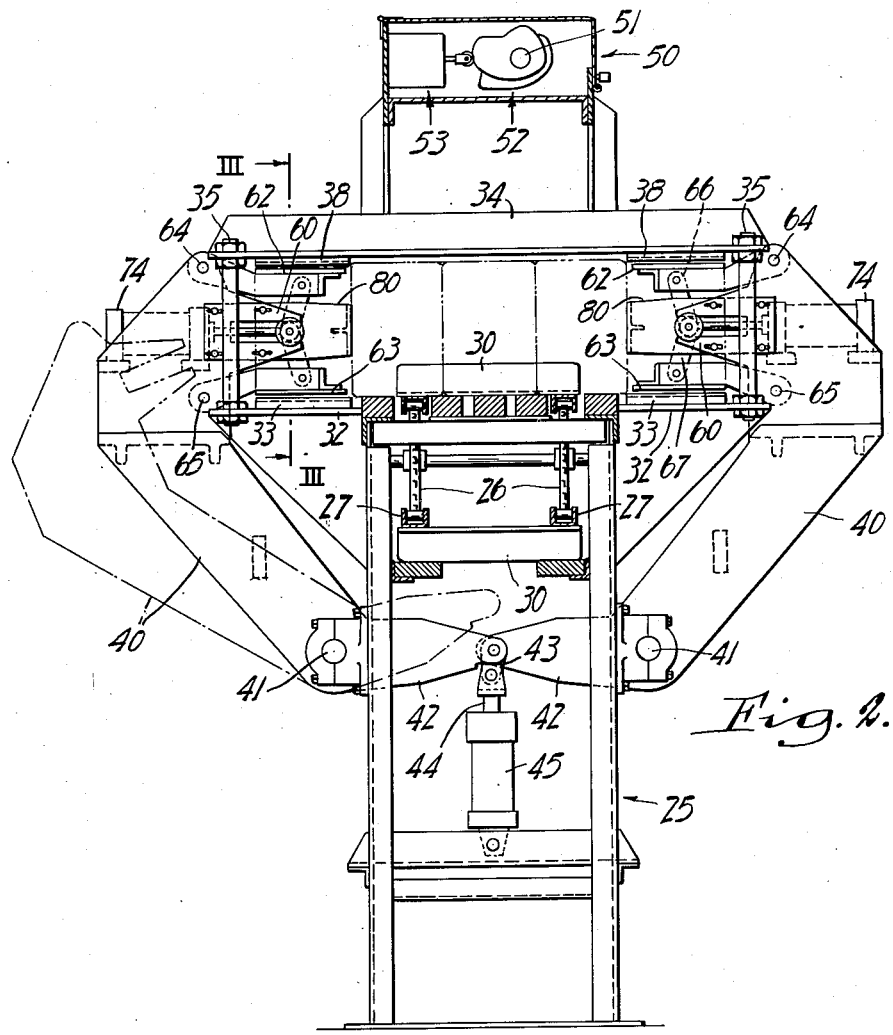
Fig. 2 is a cross-sectional view taken approximately on the line II—II of Fig. 1.

The table structure includes bearings for supporting, at each end of the table, a pair of spaced coaxial sprockets designated 26 in Fig. 2, and chains 27 which extend about the sprockets and run lengthwise of the apparatus have upper reaches which lie between certain of the rails which form the top of table 25. A series of angle members 30 are fixed to the outside of chains 27 and move along above the top of the table from one end to the other with the chains. These angles are spaced along the chain at a pitch equal to the distance between centers of the several operating stations of the apparatus and are driven intermittently to move filled and wrapped bags from the point where they are deposited from the turret mechanism to and from each of the successive stations.

Reference will now be had particularly to Figs. 2 through 7, which show in detail the mechanism at the first operating station of the present apparatus at which station mechanism moves into the opposite open ends of each wrapped bag to crease the end tucks and flaps thereof. This station is designated generally by the numeral 31 in Fig. 1. At this station, table 25 has fixed side extensions 32 which support lower stationary creasing dies 33.

An angle iron frame 34 is supported in a spaced position above the top of table 25 by tie rods 35, whose lower ends are fixed to the side extension 32, and the framework 34 has fixed to its under side upper stationary creasing die elements 38.

Through the operation of chains 27 and angle irons 30 filled, wrapped, open-ended bags are brought to the station now being described, and the bags come to rest with their ends disposed between the lower and upper stationary die members 32 and 38, respectively. The movable creasing die members at each side of the machine are carried by pairs of arms 40 which are fixed to rock shafts 41 having bearing against the framework of table 25. Each pair of arms 40 has a further arm 42 which extends toward the center line of the machine, as viewed in Fig. 2, and likewise converges toward the center of the creasing station, as viewed in Fig. 4. The inner ends of the arms 42 are pivoted to links 43, which are in turn pivoted to the upper end of a piston rod 44 which extends upwardly from a fluid-pressure-operated cylinder 45.

It will be clear from the foregoing that pressure operation of cylinder 45 moves the arms 40 from their withdrawn inoperative position, indicated in dotted lines at the left of Fig. 2, to their operative positions illustrated in full lines in Fig. 2 by downward movement of piston rod 44.

A superstructure extends above the table 25 as indicated generally at 50 in Fig. 2, this structure being removed in Fig. 1 for clearness of illustration of the mechanism below. This superstructure gives bearing support to a longitudinal cam shaft 51 on which a multiplicity of cams, designated generally 52, are mounted. Rotation of shaft 51 causes cams 52 to operate a plurality of pressure control valves designated generally 53. These valves control the application of pressure to cylinder 45 and numerous other similar cylinders which effect operation of the various mechanical instrumentalities. The provision of suitable cams for properly timing the operation of the various devices is a routine matter for a workman in this art, and accordingly the detailed profiles of the various cams need not be illustrated.

The upper ends of each pair of levers 40 comprise spaced side wall portions 60, and similar upper and lower movable creasing plates 62 and 63 are pivoted thereto as at 64 and 65, respectively, in Fig. 5. One of the upper movable creasing plates 62 is shown in perspective in Fig. 6. The outer ends of pairs of opposed toggle links 66 and 67 are pivoted to the upper and lower movable creasing plates 62 and 63 as shown at 68 and 69, respectively, in Fig. 5, and the inner ends of the toggle links 66 and 67 are concentric and bear upon a reduced circular outer end portion of a bar 70. The outer end portions of bar 70 are further provided with bearings 71 which are axially slidable in horizontal slots formed in portions of the walls 60.

A power cylinder 74 is supported between each pair of wall portions 60, and its operating piston rod 75 is connected at its outer end to block 70. It is obvious from the foregoing that energization of power cylinder 74 to move the left-hand piston rod 75 to the right as viewed in Figs. 2 and 5 causes the toggle links 66 and 67 to spread the creasing plates 62 and 63 about end pivots 64 and 65 to effect a creasing operation in cooperation with the stationary creasing plates 38 and 33, respectively. Converse movement of piston rod 75 upon a reversal of the pressure connections to power cylinder 74 withdraws the movable creasing plates to the dot-and-dash line positions illustrated in Fig. 5.

A pushing member 80 which is U-shaped in plan view has its opposite leg portions fixed to the inner sides of wall portions 60, screw and slot connections being provided to permit longitudinal adjustment. The pusher 80 normally operates as a fixed part of arms 40 and, upon movement of the latter from the dot-and-dash line position of Fig. 2 to the full-line position, the pushers 80 bear against the small bags in the larger surrounding bag and center and compact the small bags in the larger thus partially fabricated bag.

It will be noted that this centering operation is performed as part of the creasing operation and immediately preceding the actual creasing so that the creases for the tucks and flaps of the bag are sure to be correctly located relative to the bag contents, and, therefor, the ultimate tucking and folding of the flaps is certain to result in a package wherein the folded ends of the bags will be tight against the smaller bags contained in the large bag.

Figure 3:
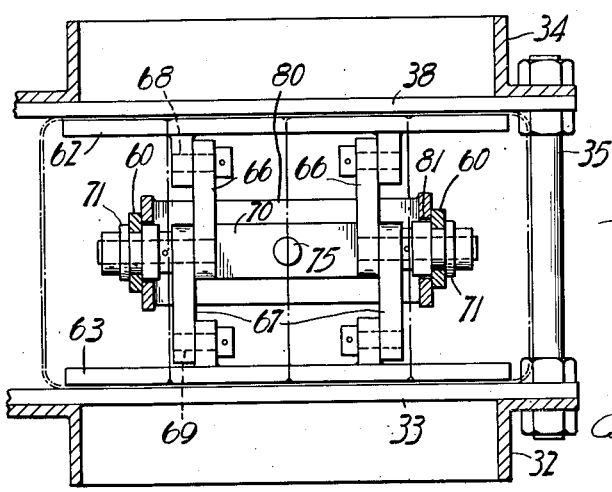
Fig. 3 is a cross-sectional view taken on the line III—III of Fig. 2.

The opposite leg portions of U-shaped pushing member 80 are horizontally slotted as indicated at 81 in Fig. 3 so as not to interfere with free horizontal movement of the end portions of toggle pivot bar 70.

Reference will now be had to the second operating station of this portion of the apparatus wherein the tucks are folded in at opposite ends of the bag. This station is designated generally by the reference numeral 85 in Fig. 1. In this connection reference will be had particularly to Figs. 8 and 9. A pair of vertical angle irons 90 at opposite sides of the table 25 are fixed at their lower ends to the general framework of the table and, as shown in Figs. 8 and 9, support an upper horizontal transverse angle iron or bar 91, which is disposed above the path of the filled bags moving along the top of table 25, and a lower angle iron or bar 92 which extends horizontally and transversely below the top of table 25.

The vertical angle irons 90 have fixed thereto plates 94 which, by means of studs 95, give rigid support to a pair of vertical side plates 96. The side plates 96 are spaced apart a distance approximately equal to the ultimate size of the bag measured from one tucked and folded end to the other, and plates 96, as will later appear, extend beyond the tuck forming station to the next adjacent station where the flaps of the bags are folded back and forth to flatten the folded flaps and further crease the lines of juncture between the flaps and the main body of the bag.

The right-hand end of each plate 96 as viewed in Fig. 8 is provided with upper and lower outwardly flaring ears 100. As a tubular open-ended bag approaches this station, its end portions having been previously scored or crimped at the creasing station 31, the flaring ears 100 engage the leading vertical wall at each end of the bag and tuck it securely over the contents of the bag as is clearly indicated at 101 in Fig. 14. Of course, the previous scoring or crimping facilitates the present tucking step and effects the formation of uniform tucks.

After the bag in question has moved fully into the station now being described, the conveying mechanism stops, and mechnaism which will now be described becomes active to form the tucks at the trailing vertical walls of the ends of the bag. Upper and lower bars 91 and 92 support bearings 103 and 104, respectively, which support vertical rock shafts 105 at either side of the machine.

Each rock shaft 105 has fixed thereto a radially projecting arm 107, and a sleeve 108 which is freely rotatable on rock shaft 105 rests upon the hub portion of arm 107. A plate 109 extends radially from each sleeve 108, and at its outer end has hinged thereto an arcuate plate 110 as at 111.

A vertical flange carried by each arcuate plate 110 adjacent the hinge 111 supports an adjustable abutment screw 113 which engages against radial plate 109 and thus limits pivotal movement of plate 110 on hinge 111. An extension spring 116 is anchored at one end to a screw or the like secured to sleeve 108 and at its other end to one end of plate 110. Spring 116 tends to rotate plate 110 on hinge 111 in a direction which keeps abutment screw 113 in abutting engagement with radial plate 109, as illustrated in full lines in Fig. 8.

Each of the plate assemblies 109, 110 is provided with a further extension coil spring 120, which may be secured at one end to a downward extension of the pin of hinge 111. The other end of each spring 120 is fixed to the outer end of arm 107. The outer end of each arm 107 has an upstanding pin 121 which, in the full-line position of Figs. 8 and 9, lies against the lower marginal portion of radial plate 109. It will be seen from this that each plate assembly 109, 110, may be swung on rock shaft 105 by rotation of bearing or sleeve 108, in a direction away from the pin 121 of arm 107. This swinging movement independently of arm 107 is accomplished against the resistance of spring 120, which normally yieldably holds each plate 109, 110 against its associated pin 121.

The full-line position of Fig. 8 shows the tucking plate assemblies 109, 110 in their idle or withdrawn positions. Their opposite limits of swinging movement are illustrated in dot-and-dash lines at the top of Fig. 8. This swinging movement is produced by means of arms 125 and 126, which are fixed to the lower ends of rock shafts 105 and are connected by a link 127, working in conjunction with an operating arm 128, which is fixed to and extends from one of the rock shafts 105 as appears in Fig. 8. The outer end of operating arm 128 is pivotally connected to the operating piston rod 129 of a fluid pressure operating cylinder 130.

After the bag has come to rest at this station the pressure connections to operating cylinder 130 are reversed by conventional means and in the manner outlined generally above, and the plates swing inwardly to the dot-and-dash line position at the top of Fig. 8. The leading edges of the plates 110 are provided with upper and lower rods 133 whose outer ends are rounded and preferably bent inwardly and downwardly as shown in Figs. 8 and 9 for smooth initial engagement with the trailing wall at opposite ends of the bag to begin the formation of a tuck at such wall.

The arcuate plates 110 are further provided at their leading edges with central flanges 135, which generally coincide with rods 133 as viewed from above and which are designed to fit vertically between the upper and lower ears 100 of the plates 96, as shown in dot-and-dash lines at the top of Fig. 8. Thus, the swinging movement of the parts just described completes the formation of the tuck and guides the vertical edge of the tuck beneath the flaring ears 100 so that in subsequent forward movement of the bag the medial portion of the tuck thus formed will be held against the contents of the bag by the side plates 96.

It will be noted that the arcuate plates 110, while normally held in the concentric position illustrated in Fig. 8 by springs 116, may yield as required during the formation of the tuck, such yielding movement stressing springs 116 and causing abutment screws 113 to move away from radial plates 109. It will further be noted that the inward swinging movement of the radial and arcuate plate assemblies 109 and 110 as a unit is accomplished through the operation of the abutment pins 121 of arms 107, since bearing sleeves 108 are freely rotatable on rock shafts 105.

Thus, the return movement of arms 107, when pressure connection to operating cylinders 130 is again reversed, does not necessarily withdraw the arcuate plates 110 from their inner position. The pull of tension spring 120 is relatively light and the friction of the leading portions of arcuate plates 110, their projecting rods 113, and medial flange 135, all bearing against the surface of the tuck just formed, can retain the arcuate plates in their inner position, even though arms 107 have again swung outwardly.

This friction may continue to hold the assemblies 109, 110 in the dot-and-dash line position shown at the top of Fig. 8 until forward movement of the bag from this station advances to a point where the trailing wall of the bag passes the frictionally engaging arcuate plates 110 and its associated parts, whereupon the plate assemblies will be returned to their full-line position by operation of the springs 120.

Figure 10:
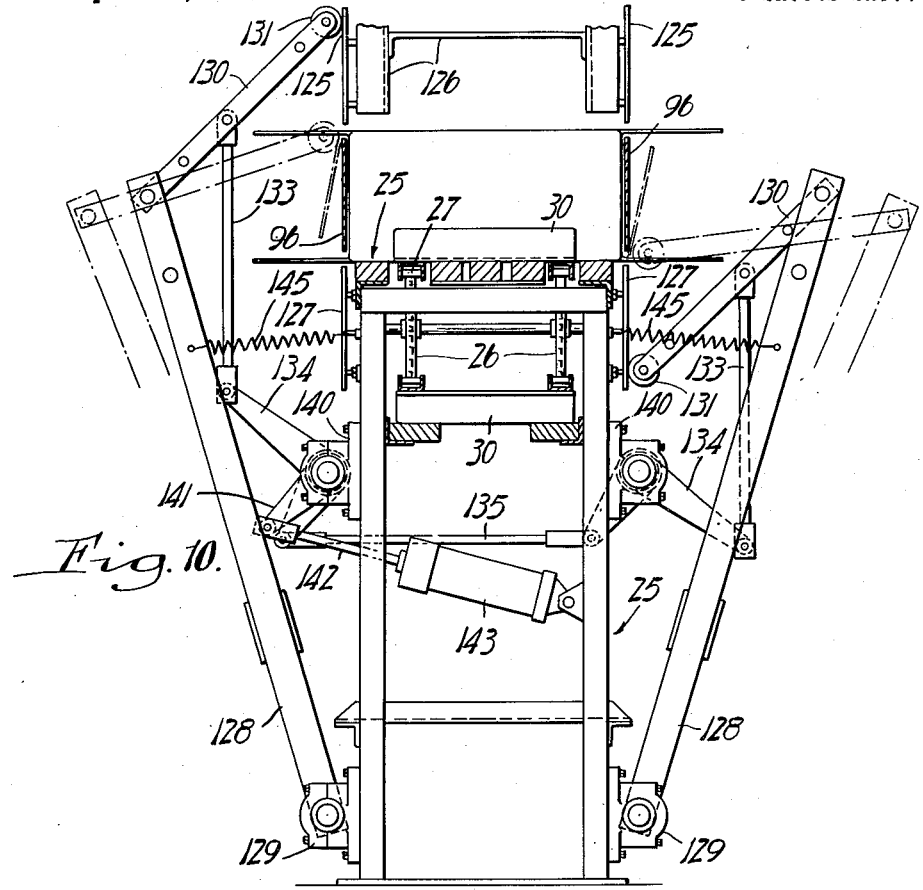
Fig. 10 is a cross-sectional view taken approximately on the line X—X of Fig. 1.
Figure 11:
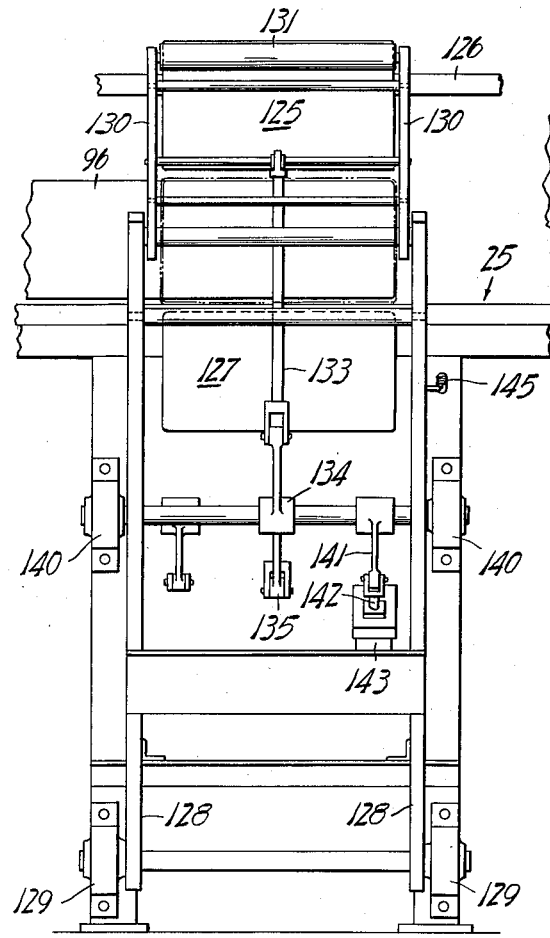
Fig. 11 is a fragmentary side elevational view of the apparatus shown in Fig. 10.
Figure 15:
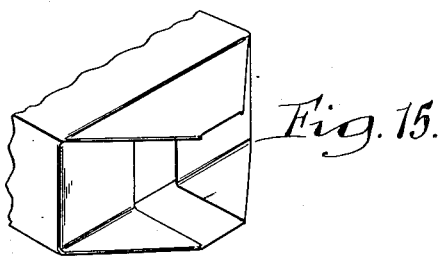
Fig. 15 is a similar view showing the completion of the side tucking operation.
Figure 16:
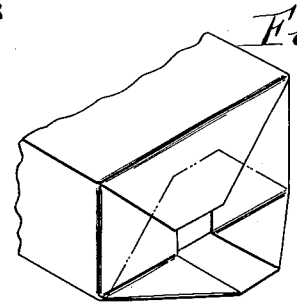
Fig. 16 is a similar view showing the flap bending operation.
Figure 17:
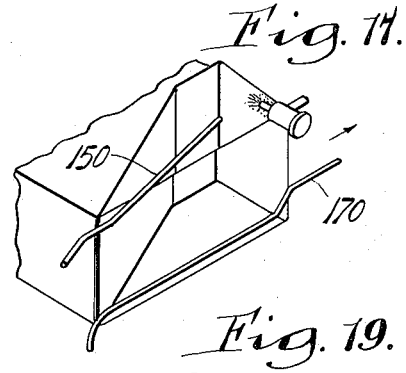
Fig. 17 is a similar view showing the final folding of the lower flap.

Reference will now be had to the next operating station of the machine, which is illustrated in Figs. 10 and 11, and in this station the top and bottom flaps at opposite ends of the bag which project outwardly after the tucking operation are folded upwardly and downwardly to flatten the flaps and further crease them along the line where they join the body of the bag so as to permit these flaps to be readily folded flat and securely against the ends of the bag. It will be noted that the outer parts of these flaps were previously creased, along the line now being recreased, at the crimping station, as indicated by the crimping or creasing dies 33 and 62 of Figs. 7 and 6, respectively.

However, certain portions of the bag tucks which lie flat against these outer portions, see Fig. 14, particularly, have not had the benefit of this die creasing or crimping, and the operation about to be described not only causes the various portions of the top and bottom flaps to lie flat against each other, but also further creases or folds the composite flap along the top and bottom edges of the bag. The work station now being described and which is shown in detail in Figs. 10 and 11 is designated generally by the reference numeral 122 in Fig. 1.

As stated previously, the plates 96 under or behind which the tuck portions of the bag feed at the tucking station extend longitudinally of the machine to and including the folding station illustrated in Figs. 10 and 11, so that they retain the medial portions of the tucks closely against the contents of the bag during passage of the bags from the tucking station to the folding station and also while the bags remain in the folding station. The plates 96 thus extend substantially the full height of the bag between the upper and lower projecting flaps, as appears clearly in Fig. 10.

Upper plates 125 are rigidly supported by a fixed superstructure indicated fragmentarily at 126, which extends outwardly and downwardly with fixed connection with the base portion of the table 25 of the machine in any desired manner. Plates 125 lie in substantially the same vertical longitudinal planes as the plates 96.

A further pair of plates 127 is fixed to the supporting structure of table 25 so as to lie directly beneath plates 96 and likewise in substantially the same vertical longitudinal planes. The outer surfaces of plates 125 and 127, as well as the outer surfaces of plates 96 serve as table surfaces against which the flaps are folded or ironed, in a manner which will presently appear. Each side of the machine is provided, at this folding station, with a pair of arms 128, which are pivotally supported at their lower ends by bearings 129 fixed to the lower framing portions of table 25.

At their upper ends each pair of arms 128 is provided with a pair of levers 130 which are pivoted to arms 128 at one end and rotatably support a pressing and folding roller 131 at their opposite ends. Each pair of levers 130 is pivotally engaged by a pull rod 133, the opposite end of which is pivoted to one arm of a bell crank 134. The other arms of the bell cranks 134 are pivotally connected to each other by a tie rod 135. The arrangement is such that rocking movement of one bell crank 134 is accompanied by an equal rocking movement of the other bell crank 134. Because of the arrangement of the bell cranks at opposite sides of the machine and with the arms which are connected to pull rods 133 extending in opposite directions, this joint movement results in one of the pull rods 133 being moved upwardly by rocking movement of its associated bell crank at the same time that the other pull rod 133 is given an equal but opposite downward movement.

The rock shafts for the bell cranks 134 are supported in bearings 140 fixed to the framework of table 20, and the rock shaft for the left-hand bell crank 134, as viewed in Fig. 10, is provided with a further arm 141, whose outer end is pivotally connected to the outer end of a piston rod 142 of a fluid pressure operating cylinder 143.

Both of the pairs of arms 128 are biased pivotally toward the center of the apparatus by extension coil springs 145, which resiliently urge the rollers 131 against upper and lower plates 125 and 127 and also against plates 96 which lie between the upper and lower plates.

Beginning with the parts in the position illustrated in Fig. 10 and with the top and bottom flaps of a bag projecting generally outwardly as shown in full lines, inward movement of piston rod 142 relative to cylinder 143 under the influence of fluid pressure oscillates both bell cranks 134 in a counterclockwise direction. This draws the left-hand pull rod 133 downwardly and projects the right-hand pull rod 133 upwardly. This causes left-hand roller 131 to traverse the plates in a downward direction and the right-hand roller 131 to traverse the plates in an upward direction. The left-hand flaps are thus folded and pressed downwardly against plates 96 and 127, and both of the right-hand flaps are thus folded and pressed upwardly against plates 125 and 96.

The energization of power cylinder 143 is then reversed through operation of its timing cam and valve means referred to previously herein, and both rollers pursue a reverse course. In this reversal the left-hand flaps are folded and pressed in an upward direction, and the right-hand flaps in a downward direction. Thus, each of the upper flaps is folded both downwardly against plate 96 and upwardly against plate 125, and each of the lower flaps is folded upwardly against plate 96 and downwardly against plate 127. The flaps are thus folded securely in a flat condition and are creased along the line where they join the bag body proper to a degree which greatly facilitates the subsequent closing and securing of the bag ends.

As the bags move from the folding station just described, the top and bottom flaps, as the net result of the double folding upwardly and downwardly, will probably project approximately horizontally as shown in full lines in Fig. 10, but their direction of projection at this point is not material since subsequent means are provided for properly relating the flaps. Reference will now be had to the means for applying glue or other adhesive to the inner surface of the top flap at each side of the package, this means being illustrated particularly in Fig. 12. The gluing station is designated generally by the reference numeral 148 in Fig. 1.

Figure 12:
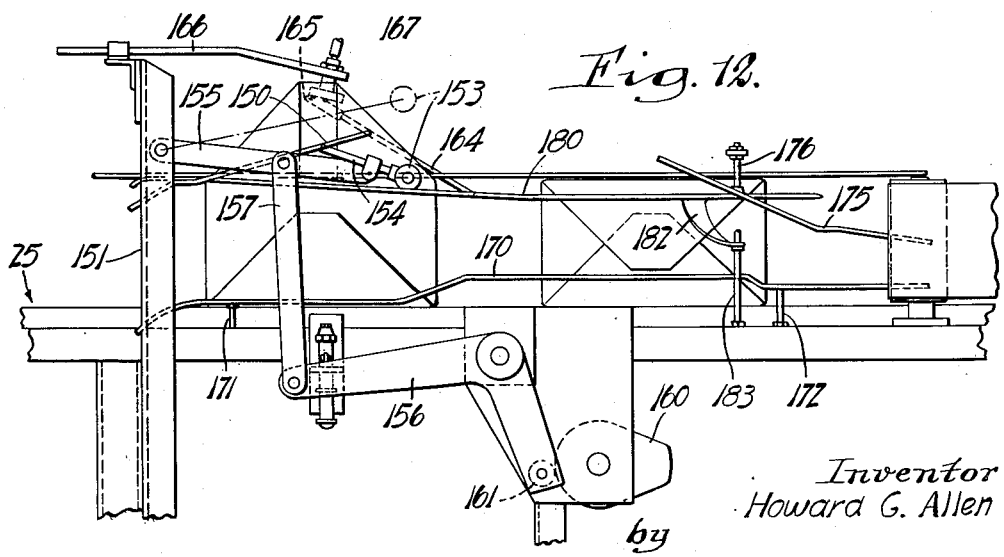
Fig. 12 is a side elevational view of another portion of the apparatus of Fig. 1 showing the means for final folding of the bag end flaps.

Prior to application of the adhesive, the top flap at each side of the bag is made to extend directly upwardly by means of rails or rods 150 which, as shown in Figs. 12 and 13, are secured to a bracket which projects inwardly from an upstanding angle iron 151. Rods 150 extend upwardly from their point of support in the direction of passage of the bags so that they engage beneath the top flaps of the bag regardless of the direction in which those flaps may extend, and, as the bag moves along, raise the top flaps and hold them in the position illustrated in Fig. 12.

The actual glue or adhesive applicator at each side of the machine includes a spray jet 153 which is directed horizontally toward the bag and is carried by an arm 154 which is adjustably secured to a further arm 155 pivoted to upstanding angle 151. A bell crank 156 is pivoted to the framework of the machine and is pivotally connected at one end to the lower end of a link 157, whose upper end is pivotally attached to arm 155. A cam 160 operates synchronously with the conveyor mechanism and may be driven from one of the shafts of the two pairs of sprockets which are designated 26 in Figs. 2 and 10 by a gear connection, not shown.

Cam 160 acts against a follower 161 at the other end of bell crank 156 so that, as the package moves along through the gluing zone, cam 160 first raises spray jet 153 in timed relation with the forward movement of the package so as to apply adhesive along an angular line parallel to the leading slanted edge of the top flap. When a given point in the passage of the bag is reached, the spray nozzle dwells briefly to apply adhesive to the top flat edge of the upstanding flap and then the cam permits the spray jet to lower and follow the trailing inclined edge of the flap.

Figure 18:
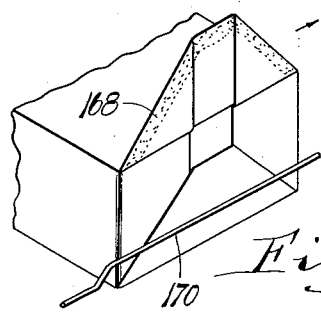
Fig. 18 is a similar view showing the completion of the pasting of the inner edge of the upper flap.
Figure 19:
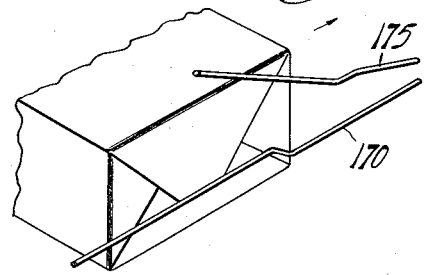
Fig. 19 is a similar view showing the folding down of the upper flap over the end of the bag, including the lower flap.

The issuance of glue or adhesive from the spray jets 153 takes place only as the bag is passing through the glue applying zone, and to this end a rod 164 is pivoted at 165 to a support 166 and normally hangs downwardly in approximately the position illustrated in Fig. 12 or lower. When a bag engages against rod 164, as it is doing in Fig. 12, it raises arm 164, which operates a valve 167 to activate the spray jet 153 by application of air pressure therethrough. The area to which glue or other adhesive is thus applied is designated 168 in Fig. 18.

During and immediately following the application of adhesive to the inner surface of the top flaps, the bottom flap at each side of the bag is being folded securely against the package by engagement with a rod 170, which appears in Figs. 12, 13, 17, 18, and 19. The opposite ends of each rod 170 are supported on studs 171 and 172, which extend upwardly from the framework of the machine, and the ends of rods 170 which are first encountered flare downwardly below the level of the lower flaps so as to engage thereunder, and the rods 170 subsequently incline upwardly and inwardly toward the body of the bag to engage the bottom flaps firmly thereagainst and hold them in such engagement until the top flaps are folded down and glued thereagainst.

A further folding rod or bar 175 at each side of the machine is supported by a downwardly extending stud or post 176 which is fixed to the framework, and rods 175 have their beginning ends above the top of the body of the bag and inwardly of the end walls of the bag so as to definitely engage behind the upstanding top flaps which have now had glue or adhesive applied to their inner faces. From this point the rods 175 slant outwardly and downwardly so as to turn the flaps down and then slant inwardly toward the body of the package to press the top flaps against the body of the bag and against the folded-up bottom flaps.

A further pair of rods 180 are supported by brackets extending inwardly from the angle irons 151 and by arms 182 fixed to studs 183. Rods 180 begin at a point outwardly of the bodies of the bags and slant gradually inwardly to engage against the folded part of the tuck inside of the hinge line of the upper flap and their final right-hand portions serve as bars or mandrels about which the rods 175 fold the top flaps.

Figure 1:
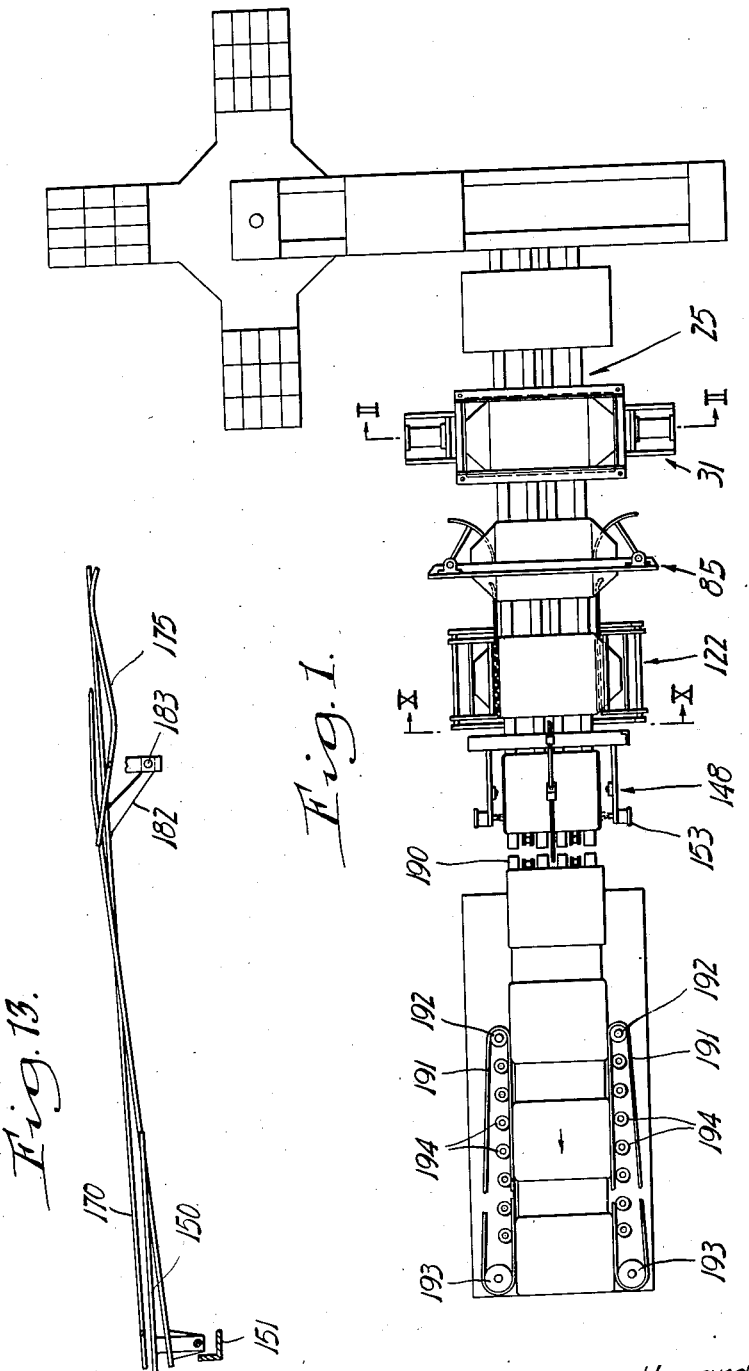
Fig. 1 is a general plan view of the apparatus in one form of the present invention, including a schematic illustration of the turret apparatus which forms the subject matter of my above-identified copending application.

As the successive bags come from the end flap closing rods just described, and in fact during their passage through the rods and immediately after completion of the glue applying step, the bags move from the intermittent conveyor provided by the chains 27 in cooperation with table 25 to a continuous chain conveyor which is designated 190 in Fig. 1 and may operate at a faster speed than the intermittent conveyor. Conveyor 190 is in substantially end to end relation with the intermittent conveyor and receives the successive bags therefrom and moves them between a pair of belts 191. Belts 191 extend about pulleys 192 and 193 at their opposite ends, the axes of the pulleys being vertical so that the inner sides of the belts engage against the ends of the bags and press them securely closed while the adhesive is setting sufficiently to cause the bags to remain closed after they pass from between belts 191.

A series of idler rollers 194 engage against an inner side of each of the belts 191 to press the entire lengths thereof firmly against the closed bags as the latter pass along between belts 191. As the bags pass beyond belts 191 they may be deposited upon a table or upon any conventional conveyor for moving them to some other point for subsequent handling.

The operation of the mechanism of each of the stations has been described in conjunction with the description of the construction and arrangement of the mechanisms, and it is therefore believed that the operation of the entire machine is clear without further separate statement of the successive steps involved in finally closing and adhesively sealing the bag ends.

What is claimed is:

1. Apparatus for closing and securing the ends of a bag which has been wrapped about the ultimate contents and secured in open-ended tubular form projecting beyond the contents at opposite ends, said apparatus comprising conveying means adapted to move successive bags intermittently to and then beyond a plurality of work stations with the ends of the bags projecting laterally beyond the conveying means, relatively stationary creasing dies at one of said work stations adapted to overlie and underlie the projecting bag ends, and complementary die means movable laterally into the bag end openings and expandable to crease the upper and lower portions of the bag ends in cooperation with the stationary creasing dies, and means operable subsequently to tuck and fold the bag ends on the creased lines.

2. Apparatus for closing and securing the ends of a bag which has been wrapped about the ultimate contents and secured in open-ended tubular form projecting beyond the contents at opposite ends, said apparatus comprising conveying means adapted to move successive bags intermittently to and then beyond a plurality of work stations with the ends of the bags projecting laterally beyond the conveying means, relatively stationary creasing dies at one of said work stations adapted to overlie and underlie the projecting bag ends, and complementary die means movable laterally into the bag end openings and against the stationary creasing dies to crease the upper and lower portions of the bag ends, and means operable subsequently to tuck and fold the bag ends on the creased lines.

3. Apparatus for closing and securing the ends of a bag which has been wrapped about the ultimate contents and secured in open-ended tubular form projecting beyond the contents at opposite ends, said apparatus comprising conveying means adapted to move successive bags intermittently to and then beyond a plurality of work stations with the ends of the bags projecting laterally beyond the conveying means, relatively stationary creasing dies at one of said work stations adapted to overlie and underlie the projecting bag ends, and complementary die means movable laterally into the bag end openings and engageable against the ends of the bag contents to center and compact the same, said die means including portions expandable to crease the upper and lower portions of the bag ends in cooperation with the stationary creasing dies, and means operable subsequently to tuck and fold the bag ends on the creased lines.

4. Apparatus for closing and securing the ends of a bag which has been wrapped about the ultimate contents and secured in open-ended tubular form projecting beyond the contents at opposite ends, said apparatus including relatively stationary creasing dies adapted to overlie and underlie the projecting bag ends, and complementary die means movable laterally into the bag end openings and expandable to crease the upper and lower portions of the bag ends in cooperation with the stationary creasing dies.

5. Apparatus for closing and securing the ends of a bag which has been wrapped about the ultimate contents and secured in open-ended tubular form projecting beyond the contents at opposite ends, said apparatus including relatively stationary creasing dies adapted to overlie and underlie the projecting bag ends, and complementary die means movable laterally into the bag end openings and engageable against the ends of the bag contents to center and compact the same, said die means including portions movable to crease the upper and lower portions of the bag ends in cooperation with the stationary creasing dies.

6. Apparatus for closing and securing the ends of a bag which has been wrapped about the ultimate contents and secured in open-ended tubular form projecting beyond the contents at opposite ends, said apparatus comprising conveying means adapted to move successive bags intermittently to and then beyond a plurality of work stations with the ends of the bags projecting laterally beyond the conveying means, creasing dies at one of said work stations adapted to overlie and underlie the projecting bag ends, and complementary creasing dies movable laterally into the bag end openings, said dies having relative vertical movement to crease the upper and lower portions of the bag ends therebetween, and means operable subsequently to tuck and fold the bag ends on the creased lines.

7. Apparatus for closing and securing the ends of a bag which has been wrapped about the ultimate contents and secured in open-ended tubular form projecting beyond the contents at opposite ends, said apparatus comprising conveying means adapted to move successive bags intermittently to and then beyond a plurality of work stations with the ends of the bags projecting laterally beyond the conveying means, creasing dies at one of said work stations adapted to overlie and underlie the projecting bag ends, and complementary creasing dies movable laterally into the bag end openings and against the ends of the bag contents to center and compact the same, said dies having relative vertical movement to crease the upper and lower portions of the bag ends therebetween, and means operable subsequently to tuck and fold the bag ends on the creased lines.

8. Apparatus for closing and securing the ends of a bag which has been wrapped about the ultimate contents and secured in open-ended tubular form projecting beyond the contents at opposite ends, said apparatus comprising conveying means adapted to move successive bags intermittently to and then beyond a plurality of work stations with the ends of the bags projecting laterally beyond the conveying means, means at one of said work stations for folding opposed projecting sides at each end of the bag over the bag contents leaving projecting flaps at the upper and lower edges of the bag ends, means beyond said folding station including a vertical plate at each end of the bag extending between the projecting flaps and lying substantially against the folded portions of the bag ends, and roller means operable to press each projecting flap against said plate to render the flaps flat and to crease the same along the lines of their joinder with the body of the bag, and means beyond said pressing station for applying an adhesive coating and closing the flaps securely over the already folded end wall portions to complete the bag formation.

9. Apparatus for closing and securing the ends of a bag which has been wrapped about the ultimate contents and secured in open-ended tubular form projecting beyond the contents at opposite ends, said apparatus comprising conveying means adapted to move successive bags intermittently to and then beyond a plurality of work stations with the ends of the bags projecting laterally beyond the conveying means, means at one of said work stations for folding opposed projecting sides at each end of the bag over the bag contents leaving projecting flaps at the upper and lower edges of the bag ends, means beyond said folding station including a vertical plate at each end of the bag extending between the projecting flaps and lying substantially against the folded portions of the bag ends, and roller means reciprocable vertically across said plate and operable to press each projecting flap against said plate to render the flaps flat and to crease the same along the lines of their joinder with the body of the bag, and means beyond said pressing station for applying an adhesive coating and closing the flaps securely over the already folded end wall portions to complete the bag formation.

10. Apparatus for closing and securing the ends of a bag which has been wrapped about the ultimate contents and secured in open-ended tubular form projecting beyond the contents at opposite ends, said apparatus comprising conveying means adapted to move successive bags intermittently to and then beyond a plurality of work stations with the ends of the bags projecting laterally beyond the conveying means, means at one of said work stations for folding opposed projecting sides at each end of the bag over the bag contents leaving projecting flaps at the upper and lower edges of the bag ends, means beyond said folding station including a vertical plate at each end of the bag extending between the projecting flaps and lying substantially against the folded portions of the bag ends, and upper and lower vertical plates generally coplanar with said first plates and lying directly above and below the upper and lower flaps respectively, and roller means operable to press each projecting flap upwardly and downwardly against said plates to render the flaps flat and to crease the same along the lines of their joinder with the body of the bag, and means beyond said pressing station for applying an adhesive coating and closing the flaps securely over the already folded end wall portions to complete the bag formation.

11. Apparatus for closing and securing the ends of a bag which has been wrapped about the ultimate contents and secured in open-ended tubular form projecting beyond the contents at opposite ends, said apparatus comprising conveying means adapted to move successive bags intermittently to and then beyond a plurality of work stations with the ends of the bags projecting laterally beyond the conveying means, means at one of said work stations for folding opposed projecting sides at each end of the bag over the bag contents leaving projecting flaps at the upper and lower edges of the bag ends, means beyond said folding station including a vertical plate at each end of the bag extending between the projecting flaps and lying substantially against the folded portions of the bag ends, and upper and lower vertical plates generally coplanar with said first plates and lying directly above and below the upper and lower flaps respectively, and roller means reciprocable vertically across said several plates and operable to press each projecting flap upwardly and downwardly against said plates to render the flaps flat and to crease the same along the lines of their joinder with the body of the bag, and means beyond said pressing station for applying an adhesive coating and closing the flaps securely over the already folded end wall portions to complete the bag formation.

12. Apparatus for closing and securing the ends of a bag which has been wrapped about the ultimate contents and secured in open-ended tubular form projecting beyond the contents at opposite ends, said apparatus comprising conveying means adapted to move successive bags intermittently to and then beyond a plurality of work stations with the ends of the bags projecting laterally beyond the conveying means, means at one of said work stations for folding opposed projecting sides at each end of the bag over the bag contents leaving projecting flaps at the upper and lower edges of the bag ends, means beyond said folding station including a vertical plate at each end of the bag extending between the projecting flaps and lying substantially against the folded portions of the bag ends, and upper and lower vertical plates generally coplanar with said first plates and lying directly above and below the upper and lower flaps respectively, and means operable to press each projecting flap upwardly and downwardly against said plates to render the flaps flat and to crease the same along the lines of their joinder with the body of the bag, and means beyond said pressing station for applying an adhesive coating and closing the flaps securely over the already folded end wall portions to complete the bag formation.

13. Apparatus for closing and securing the ends of a bag which has been wrapped about the ultimate contents and secured in open-ended tubular form projecting beyond the contents at opposite ends, said apparatus comprising conveying means adapted to move successive bags intermittently to and then beyond a plurality of work stations with the ends of the bags projecting laterally beyond the conveying means, means at one of said work stations for folding opposed projecting sides at each end of the bag over the bag contents leaving projecting flaps at the upper and lower edges of the bag ends, means beyond said folding station including a vertical plate at each end of the bag extending between the projecting flaps and lying substantially against the folded portions of the bag ends, and upper and lower vertical plates generally coplanar with said first plates and lying directly above and below the upper and lower flaps respectively, and means reciprocable vertically across said several plates and operable to press each projecting flap upwardly and downwardly against said plates to render the flaps flat and to crease the same along the lines of their joinder with the body of the bag, and means beyond said pressing station for applying an adhesive coating and closing the flaps securely over the already folded end wall portions to complete the bag formation.

14. Bag closing apparatus comprising means engaging an open bag end and folding opposed sides thereof over the bag contents leaving projecting flaps at the remaining two opposed sides of the bag end, pressing means including a plate disposed to lie against the folded portions of the bag end and between the projecting flaps, and roller means reciprocable across said plate to press each projecting flap thereagainst to render the same flat and to crease the same along the line of its joinder with the body of the bag.

15. Bag closing apparatus comprising means engaging an open bag end and folding opposed sides thereof over the bag contents leaving projecting flaps at the remaining two opposed sides of the bag end, pressing means including a plate disposed to lie against the folded portions of the bag end and between the projecting flaps, a pair of plates generally coplanar with the first plate and lying adjacent the outsides of the flaps, and roller means reciprocable across said several plates to press each projecting flap back and forth against the plates adjacent thereto to render the flaps flat and to crease the same along the lines of their joinder with the body of the bag.

16. Bag closing apparatus comprising means engaging an open bag end and folding opposed sides thereof over the bag contents leaving projecting flaps at the remaining two opposed sides of the bag end, pressing means including a plate disposed to lie against the folded portions of the bag end and between the projecting flaps, a pair of plates generally coplanar with the first plate and lying adjacent the outsides of the flaps, and means operative to press each projecting flap back and forth against the plates adjacent thereto to render the flaps flat and to crease the same along the lines of their joinder with the body of the bag.

HOWARD G. ALLEN.

REFERENCES CITED

The following references are of record in the file of this patent:

UNITED STATES PATENTS

| Number | Name | Date |
|---|---|---|
| 1,081,583 | Crowell | Dec. 16, 1913 |
| 1,350,608 | Harriss | Aug. 24, 1920 |
| 1,539,400 | Neusbaum | May 26, 1925 |
| 1,988,839 | First | Jan. 22, 1935 |
| 2,117,347 | Molins | May 17, 1938 |
| 2,171,172 | Chalmers | Aug. 26, 1939 |
| 2,217,784 | Bennett et al. | Oct. 15, 1940 |
| 2,268,283 | Harris et al. | Dec. 30, 1941 |
| 2,272,255 | Vergobbi | Feb. 10, 1942 |
| 2,281,887 | Smith | May 5, 1942 |
| 2,336,795 | Malhiot | Dec. 14, 1943 |

OTHER REFERENCES

"Modern Packaging," Jan. 1937.